United States Patent [19]

Pagnanelli et al.

[11] Patent Number: 4,769,868
[45] Date of Patent: Sep. 13, 1988

[54] CAR WASH MACHINE WITH ROLLING GRAVITY PRESSURE CONTROLLED WRAP BRUSHES

[76] Inventors: Victor Pagnanelli, 26 Vassal St., Garden City, N.Y. 11530; Douglas F. O'Campo; Vincent Pagnanelli, both of 242-21 Braddock Ave., Bellerose, N.Y. 11426

[21] Appl. No.: 918,011

[22] Filed: Oct. 14, 1986

[51] Int. Cl.⁴ .............................................. B60S 3/06
[52] U.S. Cl. ................................ 15/53 AB; 15/97 B; 15/DIG. 2
[58] Field of Search ............ 15/53 A, 53 AB, DIG. 2, 15/97 B

[56] References Cited

U.S. PATENT DOCUMENTS

| 3,233,264 | 2/1966 | Nickl et al. | 15/53 A |
| 3,662,419 | 5/1972 | Dini | 15/53 A |
| 3,747,151 | 7/1973 | Takeuchi | 15/53 A |
| 3,772,725 | 11/1973 | Shelstad | 15/53 AB |
| 3,867,735 | 2/1975 | Takeuchi | 15/53 A |
| 3,913,161 | 10/1975 | Takeuchi | 15/53 A |

FOREIGN PATENT DOCUMENTS 2238210 4/1981 Fed. Rep. of Germany ... 15/53 AB

Primary Examiner—Edward L. Roberts
Attorney, Agent, or Firm—Michael I. Kroll

[57] ABSTRACT

An improved car wash is provided and consists of a structure for positioning by gravity pressure a rotating wrap brush on a support frame transversely into a path of a vehicle so that when the wrap brush is contacted by the vehicle the wrap brush will move across front, along one side and across back of the vehicle to wash the vehicle.

3 Claims, 1 Drawing Sheet

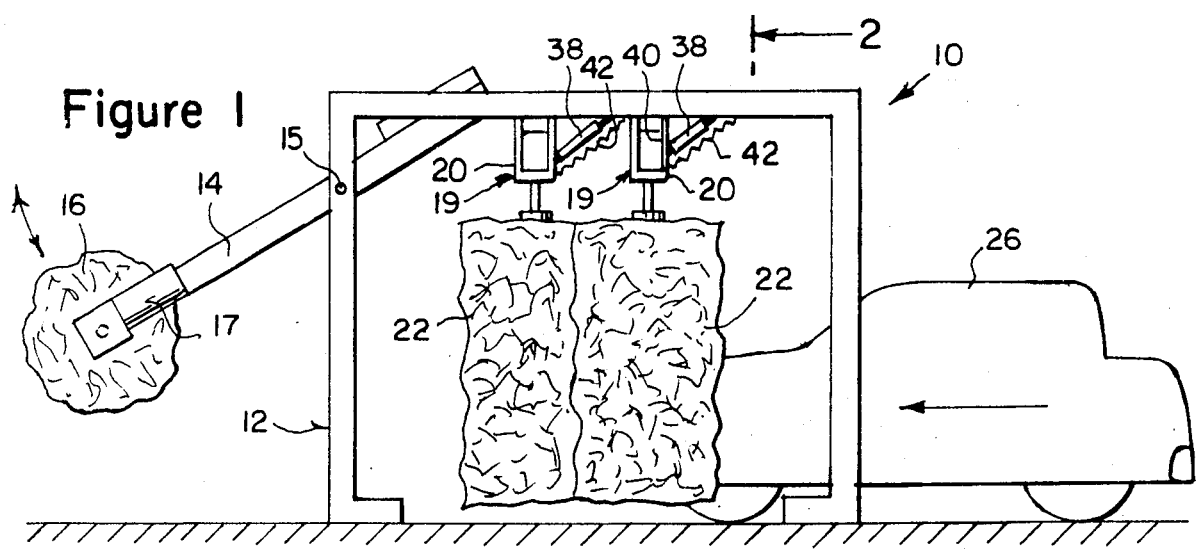
Figure 1
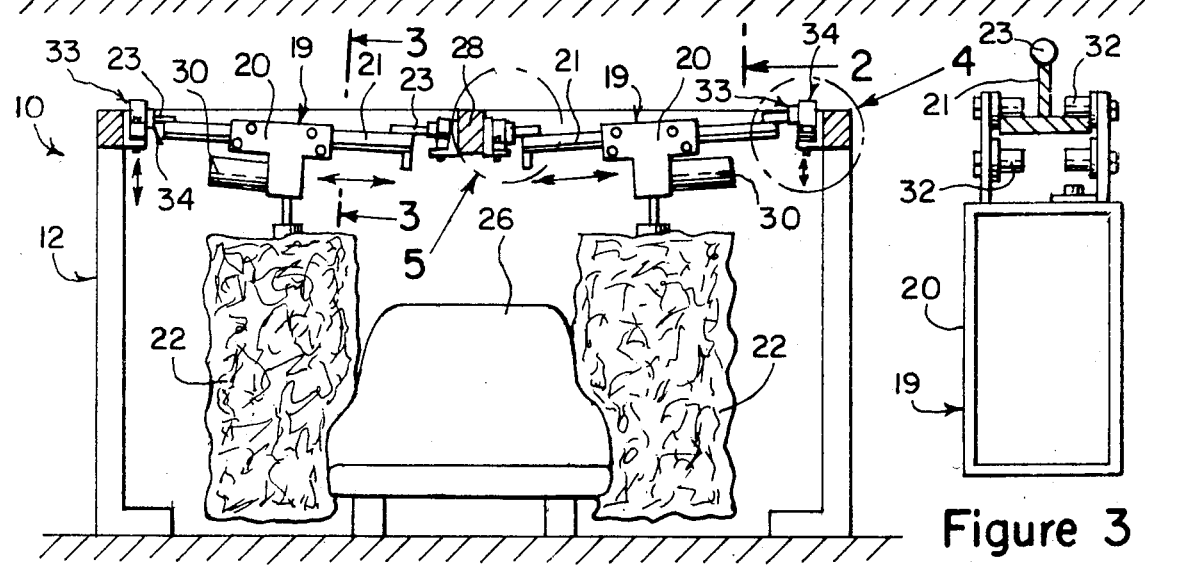
Figure 2
Figure 3
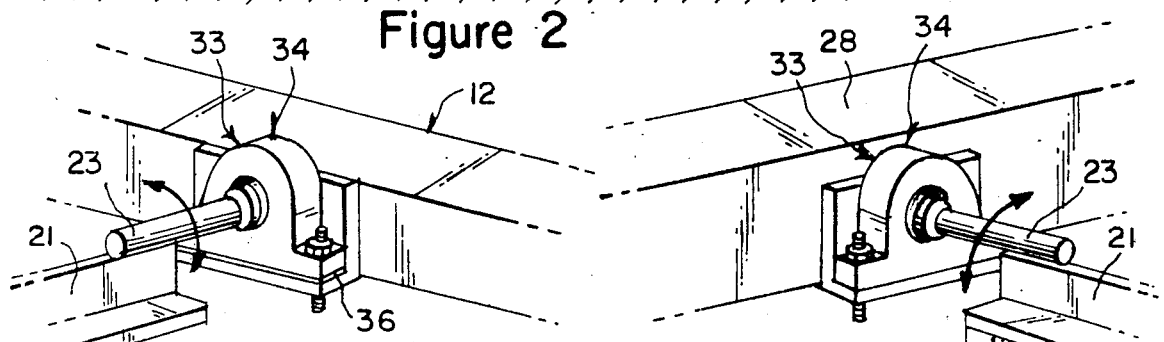
Figure 4  Figure 5
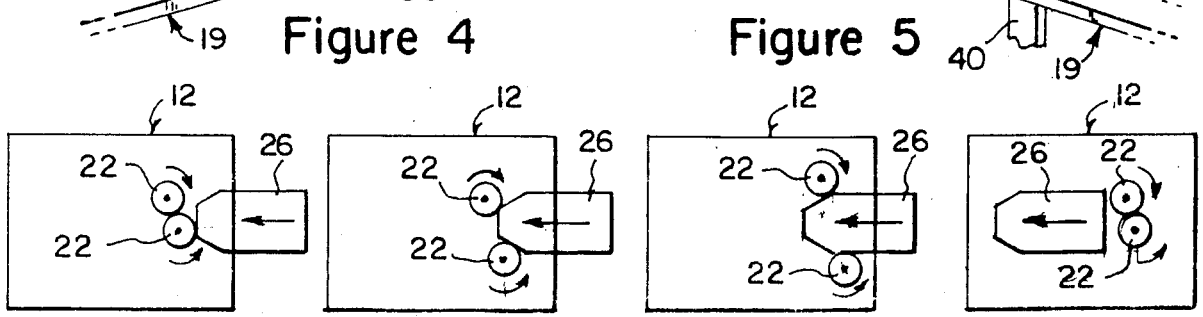
Figure 6a  Figure 6b  Figure 6c  Figure 6d

CAR WASH MACHINE WITH ROLLING GRAVITY PRESSURE CONTROLLED WRAP BRUSHES

BACKGROUND OF THE INVENTION

1. Field of the Invention

The instant invention relates generally to vehicle washing devices and more specifically it relates to an improved car wash machine with rolling gravity pressure controlled wrap brushes.

2. Description of the Prior Art

Numerous vehicle washing devices have been provided in prior art that are adapted to include rotating brush assemblies that are pivotly mounted thereto for cleaning vehicles. For example, U.S. Pat. Nos. 3,471,883; 3,720,972; 3,755,844; 4,198,722; 4,225,995; 4,270,958; 4,299,003 and 4,354,291 all are illustrative of such prior art. While these units may be suitable for the particular purpose to which they address, they would not be as suitable for the purposes of the present invention as heretofore described.

SUMMARY OF THE INVENTION

A primary object of the present invention is to provide an improved car wash that will overcome the shortcomings of the prior art devices.

Another object is to provide an improved car wash employing wrap brushes that are controlled by gravity pressure which will bring the wrap brushes transversely into the path of a vehicle to be washed.

An additional object is to provide an improved car wash in which the gravity pressure controlled wrap brushes will effectively clean front, sides and back of the vehicle.

A further object is to provide an improved car wash that is simple and easy to use.

A still further object is to provide an improved car wash that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a side view of the invention.

FIG. 2 is a cross sectional view taken along line 2—2 in FIG. 1.

FIG. 3 is an enlarged cross sectional view taken along line 3—3 in FIG. 2.

FIG. 4 is an enlarged perspective view as indicated by numeral 4 in FIG. 2 showing the adjustable bearing bracket in greater detail.

FIG. 5 is an enlarged perspective view as indicated by numeral 5 in FIG. 2 showing the other bearing bracket in greater detail.

FIGS. 6a to 6d are diagrammatic top views showing the vehicle traveling therethrough with the wrap brushes at different stages traveling along front, sides and back of the vehicle.

DETAILED DESCRIPTION OF THE PREFERRED EMBODIMENTS

Turning now descriptively to the drawings, in which similar reference characters denote similar elements throughout the several views, FIGS. 1 through 6d illustrates an improved car wash 10 of the type having a support frame 12 extending over a predetermined path of a vehiole 26 to be washed, a pair of rotatable wrap brushes 22 for washing the vehicle 26 and motors 30 for rotating the wrap brushes 22. The improvement comprises structures 19 for positioning by gravity the rotating wrap brushes 22 on the support frame 12 transversely into the path of the vehicle 26 so that when the wrap brushes 22 are contacted by the vehicle, each of the wrap brushes will move across front, along one side and across back of the vehicle 26.

Each of the gravity positioning structures 19 include a track member 21 mounted overhead onto the support frame 12 and its center cross brace 28. The track member 21 is angled downwardly to intersect with the path of the vehicle 26. A guide member 20 which has rollers 32 therein rides on the track member 21 with the rotatable wrap brush 22 extending downwardly therefrom. As best seen in FIGS. 4 and 5 a mechanism 33 is provided for rotating the track member 21 in response to a force of the vehcile 26 against the wrap brush 22. The rotating mechanism 33 includes the track member 21 having a pair of posts 23 in which each of the posts are affixed to one end of the track member. A pair of bearing brackets 34 are each mounted overhead on the support frame 12 and its center cross brace 28. One of the bearing brackets 34 remote from the path of the vehicle 26 (FIG. 4) is mounted slightly higher by a shim 36 than the other bearing bracket 34 which is mounted on the cross brace 28 (FIG. 5) over the path of the vehicle 26. The bearing brackets 34 receive the posts 23 from the track member 21 allowing the track member to rotate thereon.

A shock absorber 38 is attached at one end to the cross brace 28 of the support frame 12 and at its other end to an arm 40 on the track member 21 to stabilize the track member and keep the wrap brush 22 in a vertical position. A tension spring 42 is also attached at one end to the cross brace 28 of the support frame 12 and at its other end to the arm 40 on the track member 21 to regulate and control rotating movement of the track member.

If the car wash 10 is of a non-drive through type, rotation of the motors 30 for the wrap brushes 22 can be reversed allowing the wrap brushes to move across back of the vehicle 26, along one side and across front to disengage from the vehicle of that the vehicle 26 can back out of the car wash 10.

The car wash 10 as shown in FIG. 1, can also contain a pair of rear angle arms 14 pivoted to the frame 12 at 15, a rear brush 16 rotatably mounted on the arms 14 and a motor 17 for rotating the rear brush 16. This equipment on the car wash 10 being conventional and not included as part of the invention.

While certain novel features of this invention have been shown and described and are pointed out in the annexed claims, it will be understood that various omissions, substitutions and changes in the forms and details of the device illustrated an in its operation can be made by those skilled in the art without departing from the spirit of the invention.

What is claimed is:

1. An improved car wash of the type having a pair of rotatable wrap brushes for washing the vehicle and motors for rotating the pair of wrap brushes, wherein the improvement comprises:
   (a) a support frame extending over a predetermined path of the vehicle to be washed and having a pair of end beams and a center beam with opposing sides;
   (b) means for positioning solely by gravity the pair of rotating wrap brushes into the path of the vehicle so that the pair of wrap brushes are free to conform to the shape of the front, side, and back of the vehicle without mechanical resistance and provide a more complete car wash without damage to the vehicle caused by malfunctioning wrap brush positioning apparatus, said gravity positioning means including a pair of track members each having ends and being mounted substantially colinearly overhead onto said support frame and angled downwaqrdly to intersect with the path of the vehicle and a pair of guide members each having rollers therein and each riding on each of said pair of track members with each of the pair of rotatable wrap brushes extending downwardly from each of the pair of track members, said each of said pair of track members moving independently of each other so that each of the warp brushes mounted to said each of said pair of track members swings away independently of each other with no restrictions when the vehicle enters the pair of warp brushes at excessive speed and prevents possible damage to the vehicle and to the pair of warp brushes; and
   (c) means for rotating said each of said pair of track members in response to a force of the vehicle against each of the pair of wrap brushes, said rotating means including a post affixed to each of said ends of said each of said pair of track members and a first pair of bearing brackets each of which mounted to each of said pair of end beams of said support frame and a second pair of bearing brackets each of which mounted to each of said opposing sides of said center beam of said support frame, each of said first pair of bearing brackets and each of said second pair of bearing brackets receiving a respective post of said pair of track members so as to allow said pair of track members to rotate in said first and second bearing brackets in response to the force of the vehicle against the pair of wrap brushes, each of said first and second pair of bearing brackets being vertically adjustable so that the pressure of the pair of rotatable wrap brushes against the vehicle is adjustable by raising and lowering said first and second pairs of bearing brackets.

2. An improved car wash as recited in claim 1, further comprising:
   (a) a shock absorber attached at one end to the support frame and at its other end to said track member to stabilize said track member and keep the wrap brush in a vertical position; and
   (b) a tension spring attached at one end to the support frame and at its other end to said track member to regulate and control rotating movement of said track member.

3. An improved car wash as recited in claim 2, wherein the rotation of the motor for the wrap brush can be reversed allowing the wrap brush to move across back of the vehicle along one side and across front to disengage from the vehicle so that the vehicle can back out of the car wash when the car wash is of a nondrive through type.

* * * * *